US010438504B1

(12) United States Patent
Jacesko

(10) Patent No.: US 10,438,504 B1
(45) Date of Patent: Oct. 8, 2019

(54) SYSTEMS AND METHODS FOR MODULATING THE DISPLAY SCREEN OF AN ELECTRONIC DEVICE

(71) Applicant: Jonathan Jacesko, Glenside, PA (US)

(72) Inventor: Jonathan Jacesko, Glenside, PA (US)

( * ) Notice: Subject to any disclaimer, the term of this patent is extended or adjusted under 35 U.S.C. 154(b) by 228 days.

(21) Appl. No.: 15/407,935

(22) Filed: Jan. 17, 2017

Related U.S. Application Data

(60) Provisional application No. 62/291,623, filed on Feb. 5, 2016.

(51) Int. Cl.
*G09B 19/00* (2006.01)
*H04L 29/06* (2006.01)
*G09B 5/02* (2006.01)

(52) U.S. Cl.
CPC ............... *G09B 19/00* (2013.01); *G09B 5/02* (2013.01); *H04L 63/08* (2013.01); *H04L 63/10* (2013.01)

(58) Field of Classification Search
CPC ........... G09B 19/00; G09B 5/02; H04L 63/08; H04L 63/10
See application file for complete search history.

(56) References Cited

U.S. PATENT DOCUMENTS

| | | | |
|---|---|---|---|
| 5,051,931 A | 9/1991 | Cheu et al. | |
| 5,381,191 A * | 1/1995 | Levy | G02C 7/14 351/159.58 |
| 5,888,173 A | 3/1999 | Singhal | |
| 6,075,525 A * | 6/2000 | Hsieh | A61H 5/00 345/589 |
| 6,237,102 B1 | 5/2001 | Lee | |
| 6,567,785 B2 | 5/2003 | Clendenon | |
| 7,672,857 B2 * | 3/2010 | Padron | G06F 19/324 600/300 |
| 8,884,734 B2 | 11/2014 | Wu | |
| 2003/0050537 A1 * | 3/2003 | Wessel | A61B 5/04325 600/300 |
| 2003/0216960 A1 * | 11/2003 | Postrel | G06Q 30/02 705/14.26 |
| 2005/0228692 A1 * | 10/2005 | Hodgdon | G06Q 30/02 705/2 |
| 2007/0106538 A1 * | 5/2007 | Holtermann | G06Q 40/08 705/4 |
| 2007/0171364 A1 * | 7/2007 | Beresford | G06Q 10/10 351/203 |

(Continued)

*Primary Examiner* — David L Lewis
*Assistant Examiner* — Shauna-Kay Hall
(74) *Attorney, Agent, or Firm* — PatentFile, LLC; Bradley C. Fach; Steve R. Kick

(57) ABSTRACT

In some embodiments, a method for modulating the display screen of a first client device may include the steps of: associating an access code with an incentive descriptor, with an alert threshold, and with an incentive redeemer in a system database; receiving the access code from the first client device; displaying the incentive descriptor associated with the access code in the system database on the display screen of the first client device; providing alerts on the display screen of the first client device at set time intervals when the display screen of the first client device is active; displaying the incentive redeemer on the display screen of the first client device in response to the number of alerts provided via the first client device meeting the number of alerts in the alert threshold.

9 Claims, 8 Drawing Sheets

(56) References Cited

U.S. PATENT DOCUMENTS

| | | | |
|---|---|---|---|
| 2007/0179356 A1* | 8/2007 | Wessel | A61B 5/14532 600/300 |
| 2009/0113008 A1* | 4/2009 | Gonzalez | G06F 19/3456 709/206 |
| 2011/0119123 A1* | 5/2011 | Mehta | G06Q 30/02 705/14.31 |
| 2012/0293331 A1 | 11/2012 | Wu | |
| 2013/0144646 A1* | 6/2013 | Loncar | G06Q 30/0207 705/2 |
| 2014/0009489 A1* | 1/2014 | Tucker | A61B 3/032 345/593 |

* cited by examiner

SYSTEMS AND METHODS FOR MODULATING THE DISPLAY SCREEN OF AN ELECTRONIC DEVICE

CROSS REFERENCE TO RELATED APPLICATIONS

This application claims priority to and the benefit of the filing date of U.S. Provisional Application No. 62/291,623, filed on Feb. 5, 2016, entitled "SYSTEMS AND METHODS FOR REDUCING SYMPTOMS OF COMPUTER VISION SYNDROME", which is hereby incorporated by reference in its entirety.

FIELD OF THE INVENTION

This patent specification relates to the field of protecting a viewer of an electronic device from symptoms of computer vision syndrome. More specifically, this patent specification relates to systems and methods that are configured to reduce symptoms of computer vision syndrome of a first user using an electronic device while allowing a second user to selectively communicate information to the first user through the electronic device.

BACKGROUND

Electronic devices with display screens have become commonplace in the everyday lives of the general population. These electronic devices are used to visually display information often for both work purposes and also for entertainment purposes which can result in an individual viewing the display screen of one or more electronic devices for prolonged periods of time.

Unfortunately, prolonged viewing of electronic device display screens can have negative health consequences for an individual such as computer vision syndrome (CVS). CVS is a condition, often temporary but with potential for chronic effects, resulting from focusing the eyes on a computer or other display device for protracted, uninterrupted periods of time. Some symptoms of CVS include headaches, blurred vision, neck pain, redness in the eyes, fatigue, eye strain, dry eyes, irritated eyes, double vision, vertigo/dizziness, polyopia, and difficulty refocusing the eyes. While taking regular breaks from viewing display screens can prevent or reduce symptoms of computer vision syndrome, most users become engrossed in their tasks and forget to take viewing breaks.

Typically, individuals that suffer vision symptoms, such as those symptoms common to CVS, are also patients of an optometrist or other vision care provider. These providers are always searching for new methods of interacting with their patients since mailings, emails, phone calls, and other direct contact methods are frequently ignored. For this reason, vision care providers have difficulty providing health-benefiting and financially-benefiting information to their patients.

Therefore, a need exists for novel systems and methods for reducing symptoms of computer vision syndrome. A further need exists for novel systems and methods for reducing symptoms of computer vision syndrome by reminding users to take regular breaks from viewing display screens. Finally, a need exists for novel systems and methods for reducing symptoms of computer vision syndrome by which vision care providers provide health-benefiting and financially-benefiting information to their patients.

BRIEF SUMMARY OF THE INVENTION

A method for modulating the display screen of a first client device is provided which may be used to provide information to the user of the client device and/or for reducing symptoms of computer vision syndrome. In some embodiments, the method may include the steps of: associating an access code with an incentive descriptor, with an alert threshold, and with an incentive redeemer in a system database, and the alert threshold may include a number of alerts required to be provided to the first client device; receiving the access code from the first client device; displaying the incentive descriptor associated with the access code in the system database on the display screen of the first client device; providing alerts on the display screen of the first client device at set time intervals when the display screen of the first client device is active; displaying the incentive redeemer on the display screen of the first client device in response to the number of alerts provided via the first client device meeting the number of alerts in the alert threshold.

A vision protection system for modulating the display screen of a client device is provided which may be used to provide information to the user of the client device and/or for reducing symptoms of computer vision syndrome. In some embodiments, the system may include: a system database having an access code associated with an incentive descriptor, with an alert threshold, and with an incentive redeemer, and the alert threshold may include a number of alerts required to be provided to the patient via a client device; a first client device having a display screen in communication with a processor and a memory in communication with the processor, and communications logic stored in the memory, executable by the processor and configured to communicate with the system database and retrieve the incentive descriptor, alert threshold, and incentive redeemer associated with an access code input into the first client device; a timer logic stored in the memory, executable by the processor and configured to count down set time intervals; a display logic stored in the memory, executable by the processor and configured to control the display of the first client device, in which the display logic displays the incentive descriptor associated with the access code on the display screen and displays an alert on the display screen at the end of time intervals counted down by the timer module, and in which the display logic displays the incentive redeemer associated with the access code on the display screen in response to the number of alerts provided on the display screen meeting the number of alerts in the alert threshold.

According to a further embodiment consistent with the principles of the invention, a method of providing information to a user while reducing symptoms of computer vision syndrome is provided. In some embodiments, the method may include the steps of: generating an access code; receiving information from a vision care provider; associating received information with the access code; querying a first user for an access code; providing information to the first user, wherein the information provides a reminder to the first user to take a break from observing a display screen to prevent or reduce symptoms of computer vision syndrome; and providing information on the first user to the vision care provider.

According to another embodiment consistent with the principles of the invention, a method of providing incentives for reducing symptoms of computer vision syndrome is provided. In some embodiments, the method may include the steps of: querying a first user for an access code; receiving an access code; retrieving an incentive associated with the access code; associating the first user with a vision care provider; providing alerts to the first user at set time intervals, wherein the alerts provide a reminder to the first user to take a break from observing a display screen to prevent or reduce symptoms of computer vision syndrome; unlocking the incentive to the first user upon the first user completing a usage threshold, wherein the incentive is made usable to the first user; and re-locking the incentive, wherein the incentive is made unusable to the first user, such as after the incentive has been realized/redeemed/used.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
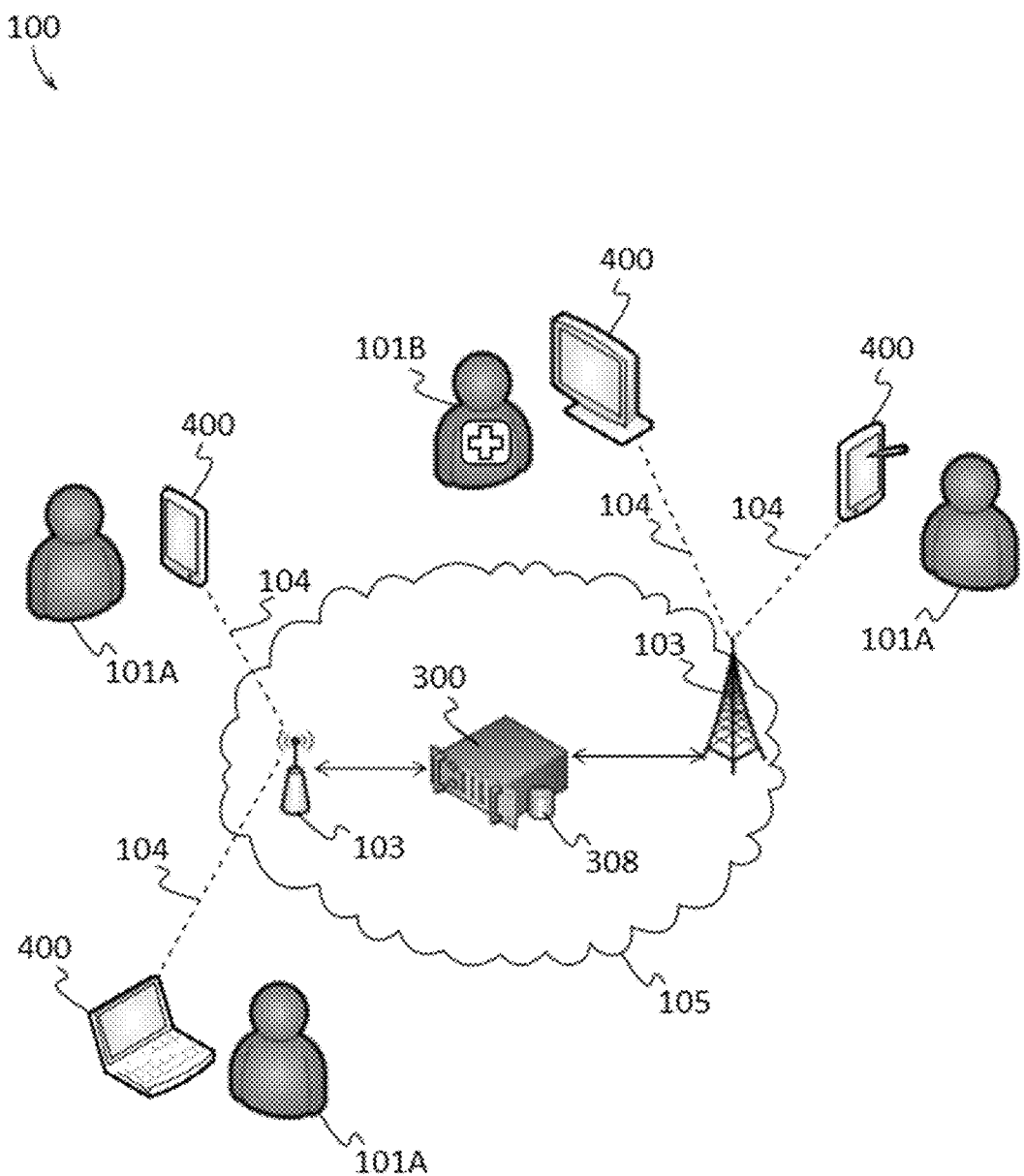
FIG. 1 depicts an illustrative example of some of the components and computer implemented methods which may be found in a system for modulating the display screen of an electronic device according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "software", "software code" or "computer software" refers to any set of instructions operable to cause a computer to perform an operation. Software code may be operated on by a "rules engine" or processor. Thus, the methods and systems of the present invention may be performed by a computer based on instructions received by computer software.

The term "electronic device" as used herein is a type of electronic device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include; personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smart phones, tablet computers, laptop computers, wearable computers such as watches, Google Glasses, etc.

The term "client device" or sometimes "electronic device" or just "device" as used herein is a type of computer generally operated by a person. In some embodiments, a client device is a smart phone or computer configured to receive and transmit data to a server or other electronic device which may be operated locally or in the cloud. Non-limiting examples of client devices include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device" or "portable device". Some non-limiting examples of mobile devices include: cell phones, smart phones, tablet computers, laptop computers, wearable computers such as watches, Google Glasses, etc.

The term "computer readable medium" as used herein refers to any medium that participates in providing instructions to the processor for execution. A computer readable medium may take many forms, including but not limited to, non-volatile media, volatile media, and transmission media.

Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoW) network.

As used herein, the term "database" shall generally mean a digital collection of data or information. The present invention uses novel methods and processes to store, link, and modify information such as digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New systems and methods for modulating the display screen of a first electronic device which may be used to reduce symptoms of computer vision syndrome are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 5:
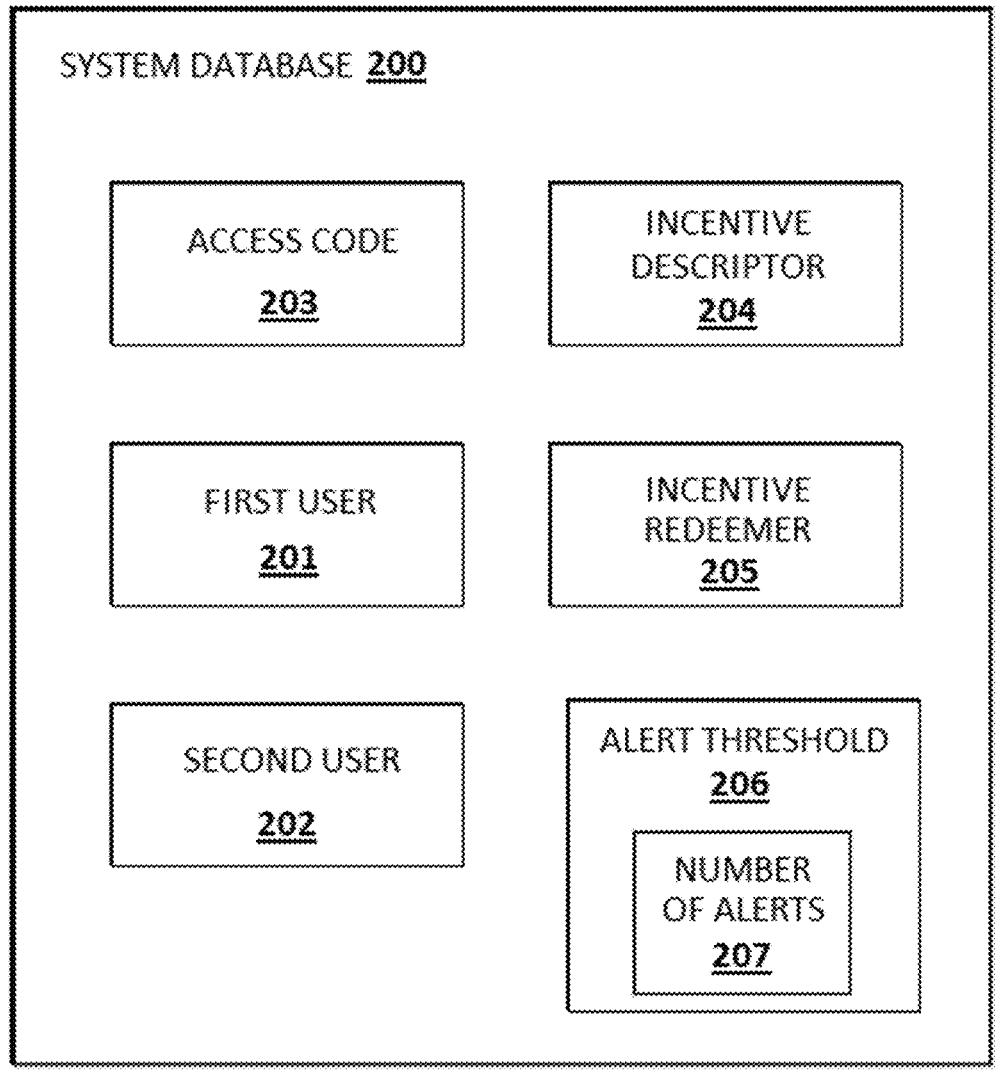
FIG. 5 illustrates a block diagram illustrating an example of a system database according to various embodiments described herein.

The present invention will now be described by example and through referencing the appended figures representing preferred and alternative embodiments. As perhaps best shown by FIG. 1, an illustrative example of some of the physical components which may comprise a system for reducing symptoms of computer vision syndrome ("the system") 100 according to some embodiments is presented. The system 100 is configured to facilitate the transfer of data and information between one or more access points 103, client devices 400, and servers 300 over a data network 105. A data store 308 accessible by the server 300 may contain one or more databases, such as a system database 200 (FIG. 5). The data may comprise any information that one or more users 101 desire to input into the system 100 including information describing one or more users 101, information describing the actions of one or more users 101, information requested by one or more users 101, information supplied by one or more users 101, and any other information which a user 101 may desire to input or enter into the system 100.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

The system 100 may be configured to modulate the display of a client device 400 to reduce or prevent symptoms of computer vision syndrome for a user 101 while also providing information to that user 101 and/or to one or more other users 101. A user 101 may include a first user 101A and a second user 101B. A first user 101A may comprise an individual that desires to use the system 100 to modulate the display screen 404A (FIG. 3) of their respective client device 400 preferably to reduce or prevent symptoms of computer vision syndrome for themselves. For the purposes of this disclosure a first user 101A may include individuals under the care of a second user 101B, such as a vision care provider, and individuals not currently under the care of a second user 101B such as a vision care provider.

A second user 101B may comprise an individual that may provide vision care to one or more first users 101A and may also be referred to as a vision care provider, optometrist, eye doctor, or other healthcare provider. In preferred embodiments, the system 100 may modulate the display screen 404A (FIG. 3) of a client device 400 provide information and/or incentives input by a second user 101B to a first user 101A while reducing or preventing symptoms of computer vision syndrome for the first user 101A. In further preferred embodiments, the system 100 may modulate the display screen 404A (FIG. 3) of a client device 400 to provide information on the actions and activities of the first user 101A to the client device 400 of the second user 101B while reducing or preventing symptoms of computer vision syndrome for the first user 101A.

Figure 2:
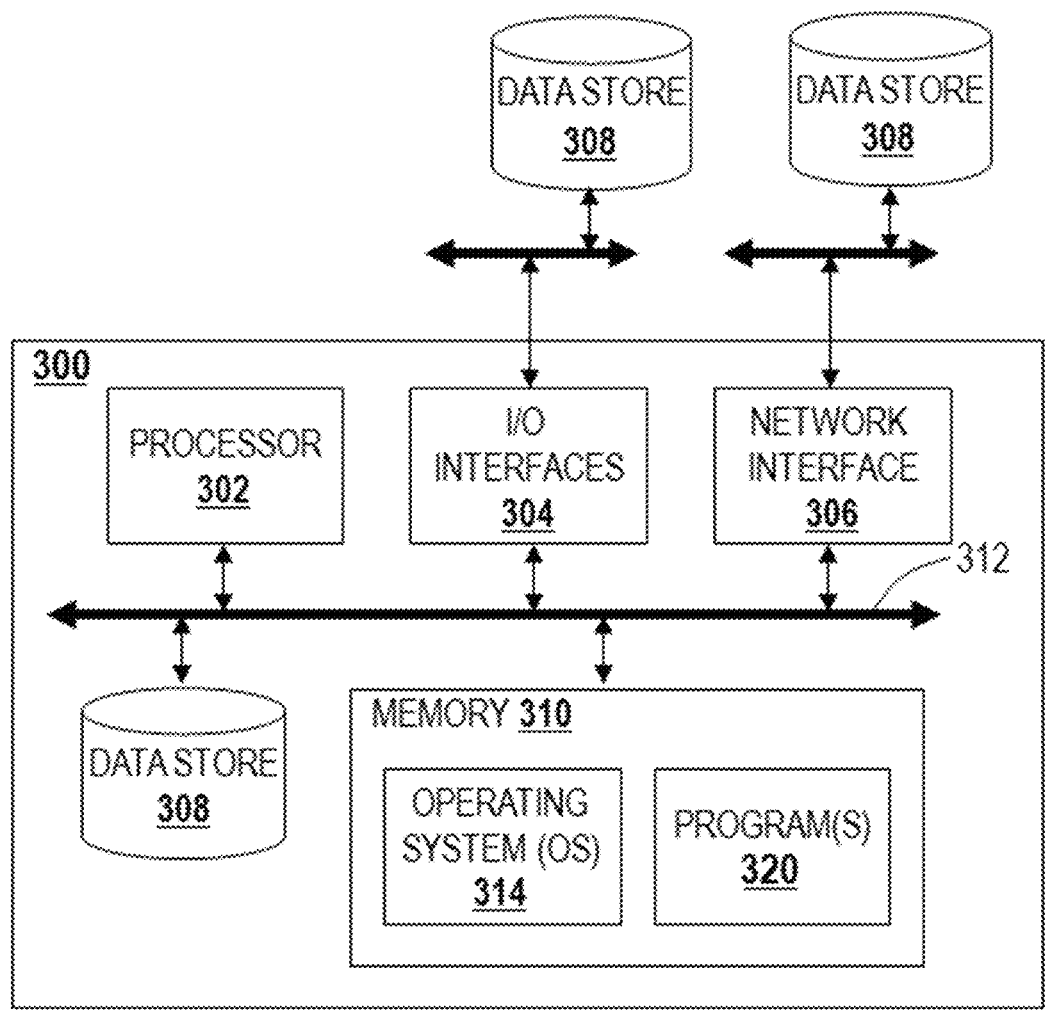
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like.

The one or more programs 320, such as an incentivization module 321 (FIG. 4) and a communications module 322 (FIG. 4) may be configured to implement the various processes, algorithms, methods, techniques, etc. described herein.

Figure 3:
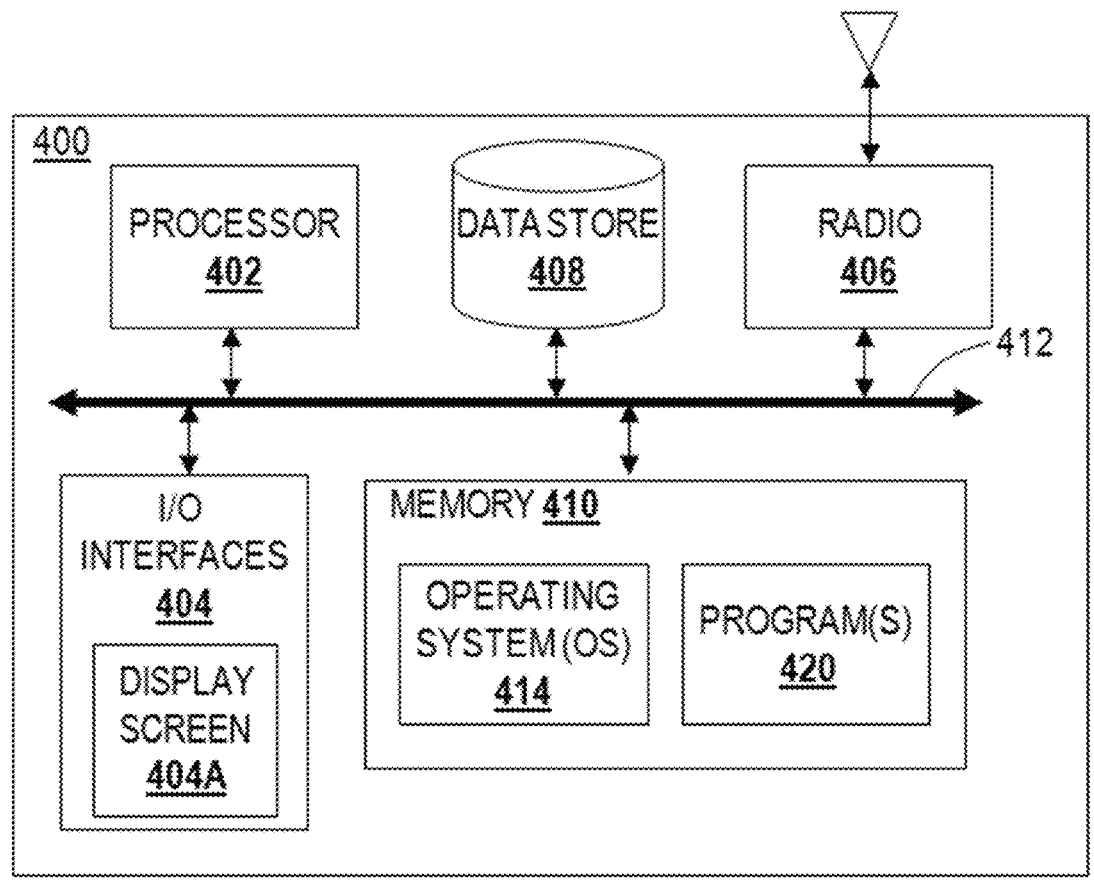
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a display screen 404A which may be a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like.

The programs 420 may include a timer module 421 (FIG. 4), display module 422 (FIG. 4), communications module 423 (FIG. 4), and various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
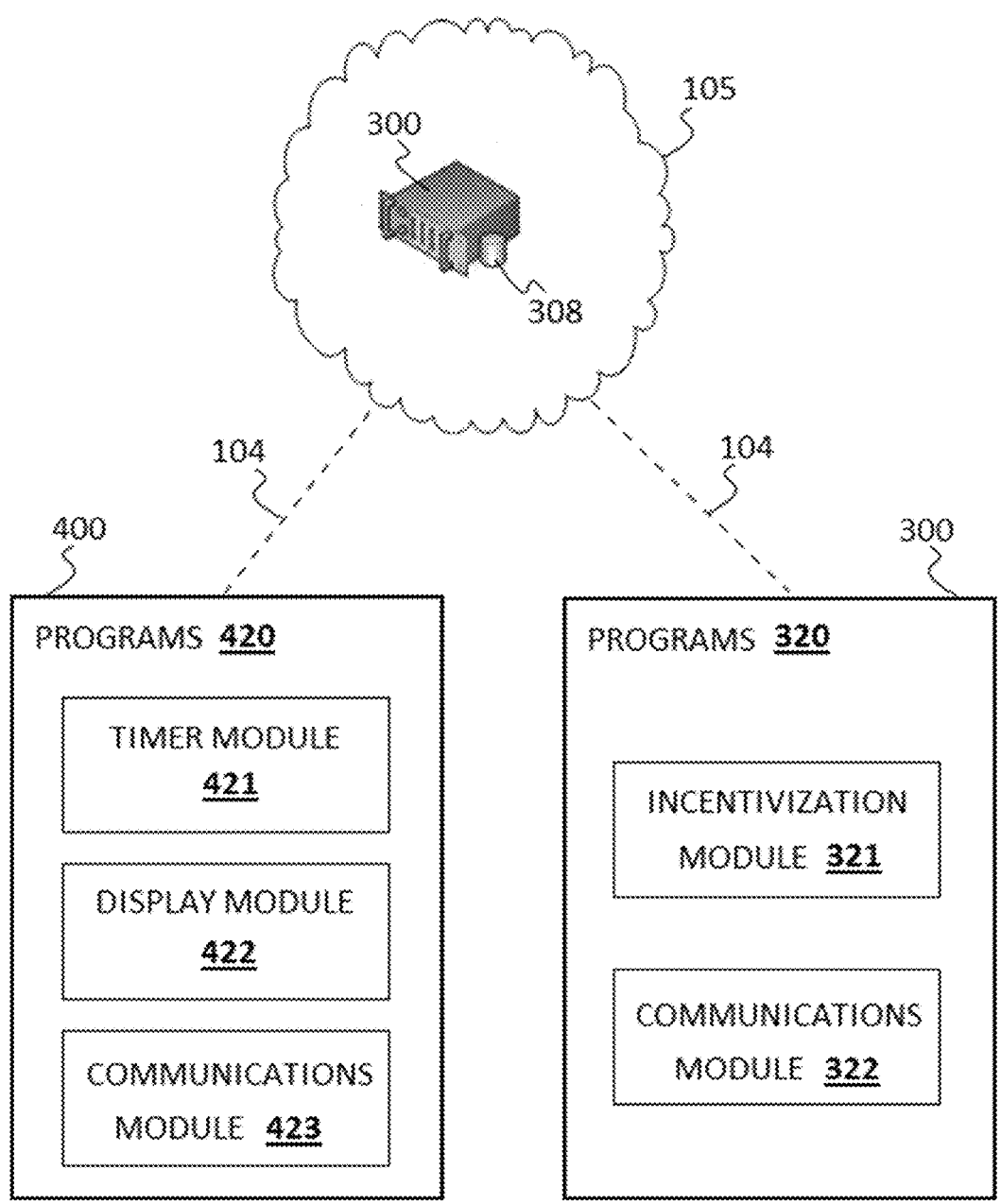
FIG. 4 depicts a block diagram illustrating some modules of a system for modulating the display screen of an electronic device which may function as software rules engines according to various embodiments described herein.

Referring now to FIG. 4 and FIG. 5, a block diagram showing some software rules engines which may be found in a system 100 (FIG. 1) and which may optionally be configured to run on a server 300 (FIGS. 1 and 2) and/or a client device 400 (FIGS. 1 and 3) which may be in communication with a system database 200 according to various embodiments described herein are illustrated. The server 300 and client device 400 may be in wired and/or wireless electronic communication through a network 105 with a data store 308 comprising a database, such as a system database 200. The engines 321, 322, 421, 422, 423, may read, write, or otherwise access data in one or more databases of the data store 308. Additionally, the engines 321, 322, 421, 422, 423, may be in electronic communication so that data may be readily exchanged between the engines 321, 322, 421, 422, 423.

In this and some embodiments, one or more servers 300 may be configured to run one or more software rules engines or programs such as an incentivization module 321 and a communications module 322 while a client device 400 may be configured to run one or more software rules engines or programs such as a timer module 421, display module 422, and communications module 423. In other embodiments, an incentivization module 321, a communications module 322, a timer module 421, a display module 422, and/or a communications module 423 may be configured to run on one or more client devices 400 and/or servers 300 with data transferred to and from one or more servers 300 in communication with a data store 308 through a network 105. In still further embodiments, a server 300 or a client device 400 may be configured to run an incentivization module 321, a communications module 322, a timer module 421, a display module 422, and/or a communications module 423. It should be understood that the functions attributed to the engines 321, 322, 421, 422, 423, described herein are exemplary in nature, and that in alternative embodiments, any function attributed to any engine 321, 322, 421, 422, 423, may be performed by one or more other engines 321, 322, 421, 422, 423, or any other suitable processor logic.

The system 100 may comprise one or more databases, such as a system database 200, optionally stored on a data store 308, 408, of one or more servers 300 and/or client device 400 accessible to the modules 321, 322, 421, 422, 423. A system database 200 may comprise any data and information input to and output by the system 100. This data may include one or more first user data records 201, second user data records 202, access code data records 203, incentive descriptor data records 204, incentive redeemer data records 205, and alert threshold data records 205.

In some embodiments, a first user data record 201 may comprise data and information on a first user 101A (FIG. 1) individual. Data describing a first user 101A may include: data on the amount of time the individual has used system 100 to modulate the display screen 404A (FIG. 3) of a client device 400 to reduce symptoms of computer vision syndrome; data inputted by the first user 101A into the system such as access codes; incentives earned by the first user 101A; incentives redeemed by the first user 101A; information viewed by the first user 101A on the display screen 404A of their client device 400; information not viewed by the first user 101A on the display screen 404A of their client device 400; location of the client device 400 of the first user 101A; one or more second users 101B associated with a first user 101A; or any other information descriptive of a first user 101A and/or the activities of the first user 101A.

In some embodiments, a second user data record 202 may comprise data and information on a second user 101B (FIG. 1) individual. Data describing a second user 101B may include: data and information desired to be displayed on a display screen 404A to one or more first users 101A that a second user 101B may input; second user 101B contact information and other information describing a second user 101B; incentives desired to be displayed to one or first users 101A that a second user 101B may select or input; one or more first users 101A associated with a second user 101B; or any other information descriptive of a second user 101B and/or the activities of the second user 101B.

In some embodiments, an access code data record 203 may comprise data and information on an access code which may be associated with one or more first users 101A and second users 101B. An access code may be a unique alpha-numeric string, barcode, matrix (2D) barcode, Data-Glyph, or any other human or machine readable representation of data.

In some embodiments, an incentive descriptor data record 204 may comprise data and information describing an incentive that may be provided to one or more first users 101A. An incentive may be or include financial incentives, coupons, offers, discounts, and the like which may entice, reward, or compensate the first user 101A for using the system 100 to modulate the display screen 404A (FIG. 3) of their client device 400. An incentive descriptor includes information which describes an incentive so that a first user 101A may ascertain what an incentive is. For example, an incentive may be a voucher for a percentage reduction in the price paid for a pair of eyeglasses. The incentive redeemer may comprise data for the incentive which states that the percentage reduction is twenty percent and that the reduction only applies to Rayban® frames.

In some embodiments, an incentive redeemer data record 205 may comprise data and information which may be used to enable the first user 101A to receive an incentive that a first user 101A may have earned for using the system 100 to modulate the display screen 404A (FIG. 3) of their client device 400. An incentive redeemer may comprise a unique alpha-numeric string, barcode, matrix (2D) barcode, Data-Glyph, or any other human or machine readable representation of data. Continuing the above example, an incentive redeemer may comprise a six digit alpha numeric code, that when entered into a point of sale device, such as a cash register or web check out page, may reduce the price of a selected pair of Rayban® frames by twenty percent.

In some embodiments, an alert threshold data record 206 may comprise data and information which may be used to satisfy system usage requirements by a first user 101A in order to receive an incentive redeemer. Generally, an alert threshold data record 206 may comprise a number of alerts 207 which are required to be provided to a first user 101A via their client device 400 in order to receive an incentive redeemer. For example, an alert threshold data record 206 may describe an alert threshold of 100 hours of system usage in which approximately 514 alerts are provided in cycles of one alert after twenty minutes has elapsed followed by one alert after twenty seconds has passed to a first user 101A via their client device 400.

The incentivization module 321 may comprise or function as incentivization logic and/or communications logic stored in the memory 310, 410 which may be executable by the processor 302, 402, of a server 300 and/or client device 400. In some embodiments, the incentivization module 321 may be run by a server 300 may be configured to send, receive, access, modify, and otherwise manipulate data in a system database 200 of a data store 308. In further embodiments, the incentivization module 321 may be configured to create and track data such as access codes of access code data records 203. A second user 101B and/or the incentivization module 321 may create an access code which may then be associated with a second user 101B and stored in the system database 200 or a data store 308 by the incentivization module 321. Additionally, each access code may also be associated with one or more first users 101A, preferably a limited number of first users 101A, and stored in the system database 200 or a data store 308 by the incentivization module 321.

In some embodiments, the incentivization module 321 may be configured to associate one or more first users 101A with one or more second users 101B in the system database 200. In further embodiments, a first user 101A may enter an access code into the system 100 via their client device 400 which is associated with a second user 101B in the system database 200, and the incentivization module 321 may then associate that first user 101A with the second user 101B in the system database 200. Once a first user 101A is associated with the second user 101B, the incentivization module 321 may allow data associated with the second user 101B to be provided to the first user 101A, such as through the client device 400 of the first user 101A, and/or data associated with the first user 101A to be provided to the second user 101B, such as through the client device 400 of the second user 101B.

In some embodiments, the incentivization module 321 may be configured to receive data provided by or selected by a second user 101B via their client device 400 and to associate that data with the second user 101B in the system database 200. The data or information may include financial incentives, such as coupons, offers, discounts, and the like, which may be provided to a first user 101A which is associated with the second user 101B in the system database 200. Also, the data may include notices, such as appointment reminders, communications, such as messages to one or more first users 101A, or any other type of message a second user 101B may desire to have associated with themselves in the system database 200.

In some embodiments, the incentivization module 321 may be configured to retrieve data associated with one or more first users 101A in the system database 200 and to provide the data to a second user 101B such as through the client device 400 of the second user 101B. In preferred embodiments, the incentivization module 321 may be configured to retrieve and display to a second user 101B data associated with one or more patients that are associated with that second user 101B in the system database 200.

The communications module 322 may comprise or function as communications logic stored in the memory 310, 410 which may be executable by the processor 302, 402, of a server 300 and/or client device 400. In some embodiments, the communication module 322 may be run on a server 300 and may be configured to govern electronic communication between the server 300 which is running the communication module 322 and one or more client devices 400, third party databases, and other severs 300. Data from severs 300, system databases 200, data stores 308, and client devices 400 may be received by the communication module 322 which may then electronically communicate the data to the incentivization module 321. Likewise, data from the incentivization module 321 may be received by the communication module 322 which may then electronically communicate the data to severs 300, data stores 308, and client devices 400. In some embodiments, the communication module 322 may govern the electronic communication by initiating, maintaining, reestablishing, and terminating electronic communication between the server 300 and one or more data stores 308, client devices 400, and other servers 300. In further embodiments, the communication module 322 may control the network interface 306 (FIG. 2) of the server 300 to send and receive data to and from one or more data stores 308, client devices 400, and other servers 300 through a network connection 104 (FIG. 1) over a network 105 (FIG. 1).

The timer module 421 may comprise or function as timer logic stored in the memory 310, 410 which may be executable by the processor 302, 402, of a server 300 and/or client device 400. In some embodiments, the timer module 421 may be configured to run on a client device 400 and to measure specified or set time intervals such as by counting upwards from zero for measuring elapsed time and by counting down from a specified or set time interval. Preferably, once a set time interval has elapsed, the timer module 421 may be configured to provide an alert, which may include an audible, tactile, and/or visual notification or reminder, to a first user 101A and which may be provided through one or more I/O interfaces 404 (FIG. 3) of the client device 400 of the first user 101A. In some embodiments, the timer module 421 may be configured to count down from a first set time interval, provide an alert, count down from a second set time interval, and then provide another alert. For example, the timer module 421 may be configured to count down for 20 minutes, play an alert sound to signal a rest period, count down for 20 seconds, and then play another alert sound to signal the end of the rest period. Optionally, the length of the set time intervals may be selected by the first user 101A and/or second user 101B. In further embodiments, the timer module 421 may be configured to count down from a first, second, third, fourth, fifth, sixth, seventh, eighth, ninth, or more set time intervals such as a continuum of set time intervals.

In some embodiments, the timer module 421 may be configured to measure elapsed time to record one or more set time intervals. In further embodiments, the timer module 421 may be configured to measure the elapsed time by determining the number of countdown set time intervals have passed. For example, the timer module 421 may be configured to count down a continuous series of 20 minute time intervals followed by 20 second intervals until a first user 101A ceases the series of intervals. The timer module 421 may then determine the total elapsed time as a function of the number of intervals that elapsed to determine the amount of time that the first user 101A has employed the timer module 421 to provide notifications of elapsed time intervals.

The display module 422 may comprise or function as display logic stored in the memory 310, 410 which may be executable by the processor 302, 402, of a server 300 and/or client device 400. In some embodiments, the display module 422 may be configured to run on a client device 400 and to govern the information which may be provided to a first user 101A and/or second user 101B. In some embodiments, the display module 422 may receive data from a system database 200 and then display the data to a first user 101A, such as through a display screen 404A (FIG. 3) of the client device 400 of the first user 101A. In further embodiments, the display module 422 may provide information to a first user 101A once the first user 101A has completed one or more actions using the system 100 via their client device 400. For example, the display module 422 may be configured to provide information, such as one or more offers, coupons, discounts, educational information, or other incentive information to a first user 101A once the patient has employed the timer module 421 to measure a certain number of elapsed time periods or has employed the timer module 421 for a certain length of time. In still further embodiments, the display module 422 may be configured to provide different information to a first user 101A once the patient has employed the timer module 421 to measure different numbers of elapsed time periods or has employed the timer module 421 for different lengths of time. In even further embodiments, the display module 422 may display an incentive descriptor associated with an access code on the display screen 404A of a client device 400 of a first user 101A. In still further embodiments, the display module 422 may display an alert on the display screen 404A of a client device 400 of a first user 101A at the end of time intervals counted down by the timer module 422. In even further embodiments, the display module 422 may display the incentive redeemer associated with an access code on the display screen 404A of a client device 400 of a first user 101A in response to the number of alerts provided on the display screen 404A meeting the number of alerts in the alert threshold.

In some embodiments, the display module 422 may receive data from a system database 200 and then display the data to a second user 101B, such as through a display screen 404A (FIG. 3) of the client device 400, of the second user 101B. In further embodiments, the display module 422 may provide information to a second user 101B which includes data associated with each first user 101A that is in turn associated with the second user 101B in the system database 200. For example, the display module 422 may provide information to a second user 101B via their client device 400 showing the system usage elapsed time and data displayed to each first user 101A that is associated with the second user 101B.

In some embodiments, a communications module 423 comprising or functioning a communications logic may be run on a client device 400 and may be similar in function to a communications module 322 of a server 300. In further embodiments, a communications module 423 may be configured to govern electronic communication between the client device 400 which is running the communication engine 422 and a server 300 of the system 100 and/or one or more other client devices 400. Data from severs 300, system databases 200, and other client devices 400 may be received by the communication module 423 which may then electronically communicate the data to the timer module 421 and display module 422. Likewise, data from the timer module 421 and display module 422 may be received by the communication module 423 which may then electronically communicate the data to servers 300 and/or other client devices 400. In some embodiments, the communication module 423 may govern the electronic communication by initiating, maintaining, reestablishing, and terminating electronic communication between the client device 400 and a server 300 of the system 100 and/or one or more other client devices 400. In further embodiments, the communication module 423 may control the radio 406 (FIG. 3) or other network interface of the client device 400 to send and receive data to and from one or severs 300 and/or client devices 400 of the system 100 through a network connection 104 (FIG. 1) over a network 105 (FIG. 1).

Figure 6:
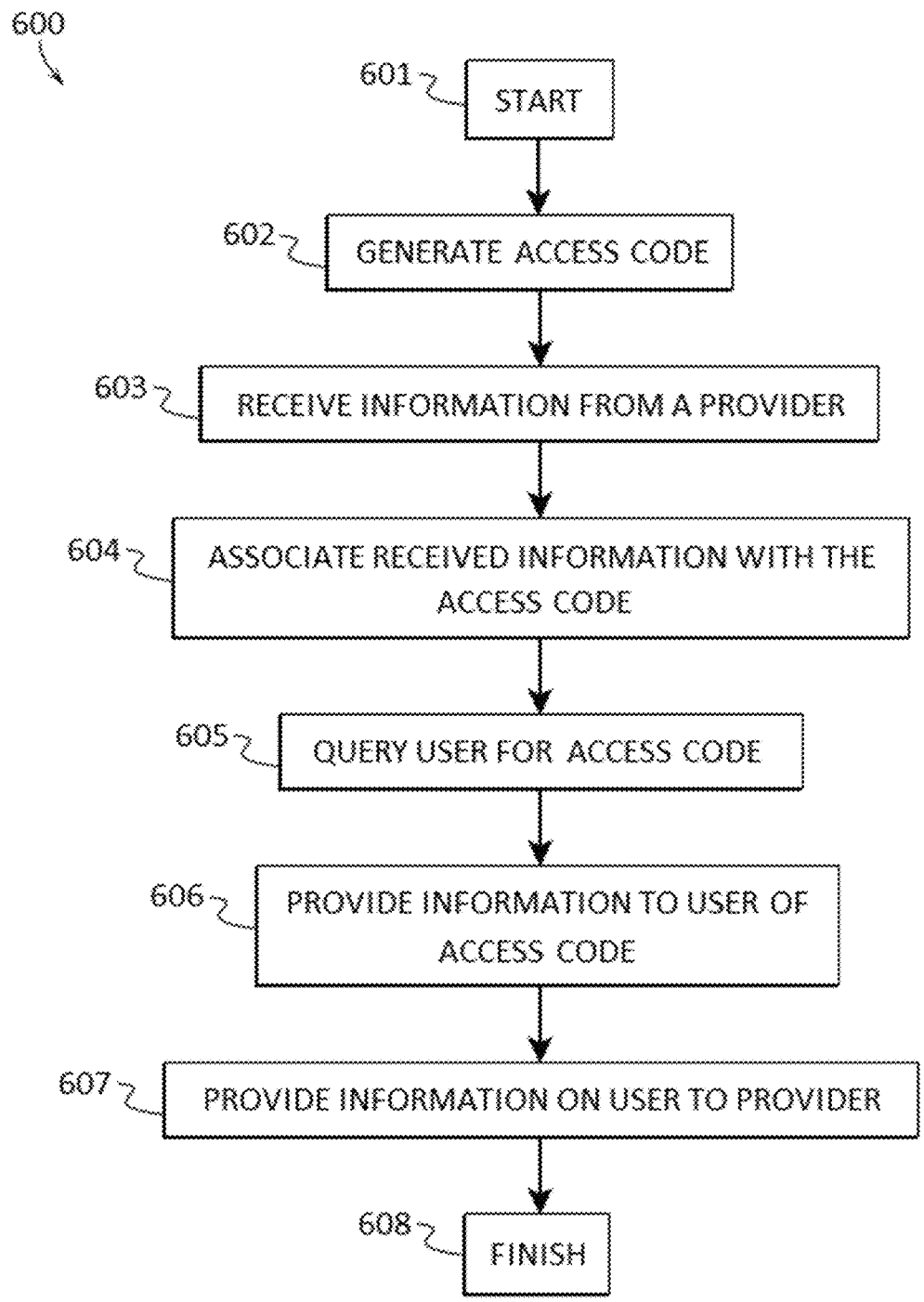
FIG. 6 shows a block diagram of an example of a computer-implemented method of providing information to a user while reducing symptoms of computer vision syndrome according to various embodiments described herein.

FIG. 6 illustrates a block diagram of an example of a method of providing information to a user while reducing symptoms of computer vision syndrome ("the method") 500 according to various embodiments described herein. The method 600 may be used to modulate the display screen 404A (FIG. 3) of a client device 400 to provide information such as incentive descriptors and incentive redeemers for incentives and offers, educational information, second user 101B information, or any other information to a first user 101A while providing alerts to the first user 101A for reducing and/or preventing symptoms of computer vision syndrome. In some embodiments, the method 600 may start 601 and an access code may be generated by the incentivization module 321 in step 602. An access code may be a unique alpha-numeric string, barcode, matrix (2D) barcode, DataGlyph, or any other human or machine readable representation of data. In further embodiments, the incentivization module 321 may generate a random access code that is unique from other access codes. In alternative embodiments, the incentivization module 321 may receive input from a second user 101B which may be used to create an access code. For example, an access code such as "DR. JONES SUMMER SPECIAL" may be generated.

In step 603, the incentivization module 321 may receive information from a second user 101B via their client device 400. Information and input may be received through a keyboard I/O interface 404, a microphone I/O interface 404, touch screen display 404A or any other I/O interface 404 of a client device 400 operated by the second user 101B which may then be communicated to a server 300 operating the incentivization module 321 through one or more communications modules 322, 423. In some embodiments, the information may include: incentive descriptors and incentive redeemers for incentives and offers, such as discounts, special offers, coupons, and the like; educational information, such as information on computer vision syndrome, and other health and wellness information; information describing the second user 101B, such as the vision care provider's 101B contact information (such as office telephone number and website address), credentials, insurance plans accepted, address, pricing information; or any other information which may be provided by a second user 101B. Continuing the example of method 600, information received by Dr. Jones, a second user 101B via a client device 400, may include a "Note from Your Doctor" which may have tips, health information, education information, or any other information Dr. Jones wishes to convey to one or more users or first users 101A which enter the access code of "DR. JONES SUMMER SPECIAL".

In step 604, the received information may be associated with the access code of step 602 and stored in a system database 200 by the incentivization module 321. In some embodiments, the incentivization module 321 may limit each access code so that it may also be associated with one or more first user 101A, preferably a limited number of first users 101A as desired by a second user 101B, and stored in a system database 200. In some embodiments, an access code may be used X number of times and every time an access code has been input by a first user 101A, the incentivization module 321 may reduce the number of times the access code may be subsequently associated with other first users 101A by X−1 in the system database 200.

Next, a first user 101A of the system 100 may be queried for an access code in step 605 through the client device 400 of the first user 101A. In some embodiments, in order to employ the timer module 421, the timer module 421 may query the first user 101A of the system 100 for an access code. In further embodiments, the incentivization module 321 may query the first user 101A of the system 100 for an access code. An access code may be input into an I/O interface 404 of the client device 400 of the first user 101A through a touch screen, keyboard, camera, microphone, or any other type of I/O interfaces 404 of the client device 400. Continuing the example of method 600, when queried for an access code, a first user 101A may input "DR. JONES SUMMER SPECIAL" via their client device 400.

In step 606, information, such as one or more alerts, incentive descriptors, and incentive redeemers, may be provided to the first user 101A that is associated with the access code in the system database 200 by the display module 422. In some embodiments, location data of the client device 400 of the first user 101A may be used to provide information to the first user 101A which includes the location of nearby second users 101B which may have access codes for the system 100. The information may include audible, visual, and/or tactile alerts provided by the timer module 421 which may be provided once one or more set time intervals or periods have elapsed. For example, the timer module 421 may count down for 20 minutes, output an alert sound to signal a rest period for a first user 101A to look away from a display screen of an electronic device 400, then count down for 20 seconds, and then output another alert sound to signal the end of the rest period indicating that the first user 101A may resume viewing the display screen of the electronic device 400. The timer module 421 may then automatically resume a new countdown of 20 minutes followed by a 20 second countdown. These alerts may be used by the first user 101A to indicate when to take breaks and when to resume viewing of the display screen to prevent prolonged viewing periods thereby preventing or reducing symptoms of computer vision syndrome of the first user 101A. Information associated with the access code may be visually displayed and/or audibly output through an I/O interface 404, such as a display screen 404A and/or speaker of the client device 400 of the first user 101A. Continuing the example of method 600, the information in the "Note from Your Doctor" may be output by being displayed on the display screen 404A of the client device 400 of the first user 101A.

Next in step 607, information may be provided on the first user 101A of the access code to the second user 101B associated with the access code in the system database 200 by the display module 422. In some embodiments, data describing the actions of a first user 101A, such as the data recorded by the timer module 421, redeemed or unredeemed incentives, incentive redeemers provided on the display screen 404A of the client device 400 of the first user 101A, coupon, offers, or information displayed on the display screen 404A of the client device 400 of the first user 101A which has entered the access code associated with the second user 101B may be displayed or output to that second user 101B through an I/O interface 404 of the respective second client device 400 of that second user 101B. In further embodiments, information describing the number of alerts provided to the first user 101A via the first client device 400 may be provided to a second client device 400 of the second user 101B that is associated with the access code received in step 605. Continuing the example of method 600, Dr. Jones may be provided system usage data and statistics, redeemed or unredeemed incentives, coupon, offers, or information displayed to the first user 101A which has entered the access code "DR. JONES SUMMER SPECIAL". After step 607 the method 600 may finish 608.

Figure 7:
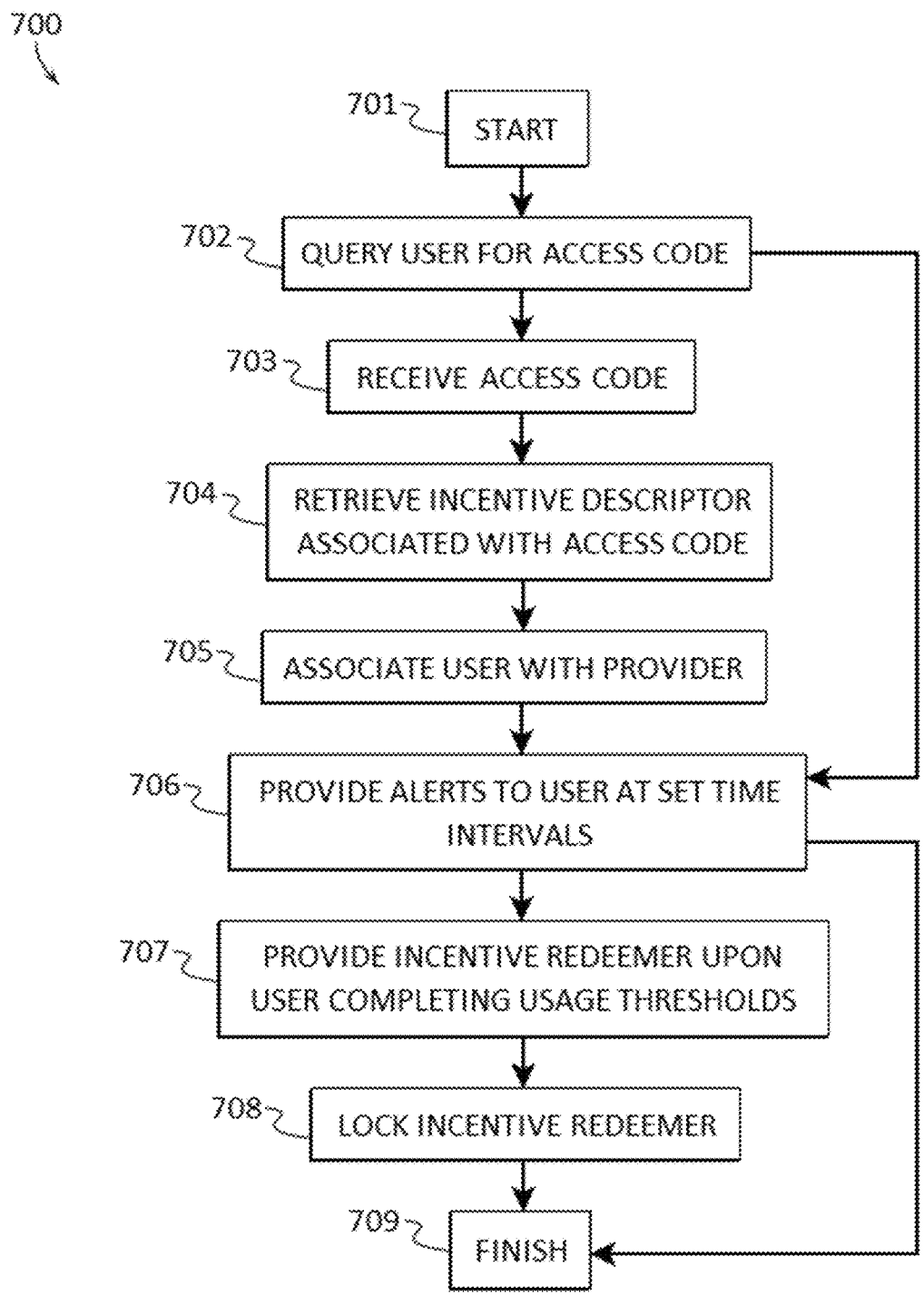
FIG. 7 depicts a block diagram of an example of a computer-implemented method of providing incentives for reducing symptoms of computer vision syndrome according to various embodiments described herein.

FIG. 7 shows a block diagram of an example of a method of providing incentives for reducing symptoms of computer vision syndrome ("the method") according to various embodiments described herein. The method 700 may be used to modulate the display screen 404A of one or more client devices 400 to provide incentives to a first user 101A and/or for reducing or preventing symptoms of computer vision syndrome. In some embodiments, the method 700 may start 701 and a first user 101A may be queried for an access code in step 702 through the client device 400 of the first user 101A. In some embodiments, in order to employ the timer module 421, the timer module 421 may query the first user 101A of the system 100 for an access code via their client device 400. In further embodiments, the incentivization module 321 may query the first user 101A of the system 100 for an access code via their client device 400. A first user 101A may obtain an access code from any suitable source including from a second user 101B, a website, a friend, an advertising source, and the like. For example, a first user 101A may receive a business card from a second user 101B which has an access code of "Family Eyecare CVS Prevention 10%". In alternative embodiments, if an access code is not provided by the first user 101A via their client device 400 the method may skip to step 706. By skipping to step 706, an unassociated first user 101A may still be provided information, such as notifications, reminders, and optionally incentives.

In step 703, an access code may be received or input through the client device 400 of the first user 101A by the communications module 422. An access code may be input into an I/O interface 404 of the client device 400 of the first user 101A through a touch screen, keyboard, camera, microphone, or any other type of I/O interfaces 404 of the client device 400. Continuing the example of method 700, a first user 101A may input "Family Eyecare CVS Prevention 10%" into their client device 400.

Next in step 704, an incentive descriptor associated with the access code may be retrieved by the communications module 423. In some embodiments, the access code may be communicated from the client device 400 to the incentivization module 321 which may retrieve one or more incentive descriptors associated with the access code from a system database 200. In preferred embodiments, an incentive descriptor may include information describing a task and a reward. By completing the task, the reward may be unlocked or earned. In some embodiments, an incentive descriptor may include information describing an offer, coupon, discount, vision care provider information, health information, or any other information which may be provided or unlocked to the first user 101A upon providing an access code and/or upon completing one or more other tasks. In preferred embodiments, only a limited number of first users 101A may use an access code to retrieve one or more incentives associated with the access code. Preferably, a second user 101B may purchase access codes which may be used by a desired number of first users 101A. For example, each access code may be used by 100, 250, 500, 750, 1000, or any other limited number of first users 101A to access the incentives associated with that access code. Continuing the example of method 700, an incentive of 10% off any pair of glasses after using the system 100 for 200 hours associated with the access code "Family Eyecare CVS Prevention 10%" may be retrieved by the incentivization module 321 and communicated to the display module 422.

In step 705 the first user 101A which has provided the access code may be associated with the second user 101B that is associated with the access code in the system database 200 by the incentivization module 321. In further embodiments, every first user 101A which provides an access code associated with a second user 101B may be associated with that second user 101B in the system database 200 by the incentivization module 321. In preferred embodiments, only a limited number of first users 101A may be associated with an access code. Preferably, a second user 101B may purchase access codes which may be used by a desired number of first users 101A. For example, each access code may be used by 100, 250, 500, 750, 1000, or any other limited number of first users 101A thereby allowing a limited number of patients to be associated with a second user 101B for that access code.

Next in step 706, one or more audible, visual, and/or tactile alerts or notifications may be provided to a first user 101A by the display module 422 via a display screen 404A at set time intervals such as when one or more time periods have elapsed as counted down by a timer module 421. An audible, visual, and/or tactile alert may be output through an I/O interface 404, such as a display screen 404A, speaker, vibrating motor, and the like, of the client device 400 of the first user 101A. For example, the timer module 421 may count down for 20 minutes, output an alert sound via a speaker to signal a rest period for a first user 101A to look away from a display screen of an electronic device 400, then count down for 20 seconds, and then output another alert sound to signal the end of the rest period indicating that the first user 101A may resume viewing the display screen 404A of the electronic device 400. The timer module 421 may then automatically resume a new countdown of cycles of a 20 minute time period followed by a 20 second time period. These alerts may be used by the first user 101A to indicate when to take breaks and when to resume viewing of the display screen 404A to prevent prolonged viewing periods thereby preventing or reducing symptoms of computer vision syndrome of the first user 101A. In further embodiments, an alert may comprise an audible, visual, and/or tactile notification provided by a display module 422 to indicate to the first user 101A that they should instill eye drops into their eyes. In further embodiments, an alert may comprise an audible, visual, and/or tactile notification provided by a display module 422 to indicate to the first user 101A that they should change out their contact lenses. In further embodiments, an alert may comprise an audible, visual, and/or tactile notification provided by a display module 422 to indicate to the first user 101A that a vision care provider appointment is approaching. In still further embodiments, an alert or notification may only be provided to the first user 101A during certain time periods of certain days by a display module 422 such as during business hours when a first user 101A is most likely to be viewing a display screen. In alternative embodiments, if an access code is not provided by the first user 101A, such as by a first user 101A that skipped from step 702 to step 706, the method may skip to step 709 and the method 700 may finish.

In step 707, an incentive redeemer may be unlocked or provided to the first user 101A by the display module 422 upon the user 101A completing a usage threshold. In some embodiments, an incentive redeemer may include an offer, coupon, discount, vision care provider information, health information, or any other information which may be provided or unlocked to the first user 101A upon the first user 101A completing one or more other tasks associated with the incentive. In preferred embodiments, an incentive redeemer may be unlocked upon a first user 101A using the system 100 to reduce or prevent symptoms of computer vision syndrome by completing a predetermined number of time intervals or by using the system 100 from a certain amount of time as measured by the timer module 421. In further embodiments, the incentive redeemer may only be provided on a display screen 404A of a client device 400 for a limited time period or until used to redeem an incentive. In further embodiment, an incentive redeemer may be provided via depressing a "Redeem Voucher" button which may be displayed to the first user 101A, such as while at point-of-sale in the vision care provider's office. In still further embodiments, an incentive redeemer may be provided to the first user 101A upon entering an e-mail address so that they can print a coupon or voucher for use in-store. Continuing the example of method 700, an incentive redeemer alphanumeric code may be provided to the first user 101A which when entered into a point of sale cash register or checkout web page may result in 10% off any pair of glasses purchased by the first user 101A upon completing the usage threshold of using the system 100 for 200 hours which was associated with the access code "Family Eyecare CVS Prevention 10%". Each incentive redeemer that is unlocked or provided may be stored in the system database 200 and may be accessible by the second user 101B associated with the incentive and access code.

Next in step 708, the incentive redeemer may be locked or inactivated by the display module 422. In some embodiments, the incentive redeemer may be re-locked upon the first user 101A redeeming or using the incentive. In further embodiments, the incentive redeemer may be prevented from being provided on the display screen 404A of a client device 400 after the time period. Continuing the example of method 700, once the first user 101A has redeemed the incentive to obtain 10% off any pair of glasses or the incentive redeemer has been displayed for a time period of ten minutes, the incentive redeemer may be locked or prevented from being displayed so that the incentive redeemer may not be used again or optionally may not be used until the patient completes another 200 hours of using the system 100. In further embodiments, the incentive redeemer may be locked or prevented from being displayed upon the expiration of a certain time period. In preferred embodiments, data describing a first user 101A such as data on the amount of time the patient has used system 100 to reduce symptoms of computer vision syndrome, data inputted by the first user 101A into the system such as access codes, incentives earned by the first user 101A, incentives redeemers provided to the first user 101A, information viewed by the first user 101A, information not viewed by the first user 101A, location of the first user 101A, one or more second users 101B associated with a first user 101A, or any other information descriptive of a first user 101A and/or the activities of the first user 101A may be stored in the system database 200 and accessed by a second user 101B using the incentivization module 321, communications modules 322, 423, and display module 422 of the vision care provider's 101B client device 400. Once step 708 has been completed, the method 700 may finish 709.

Figure 8:
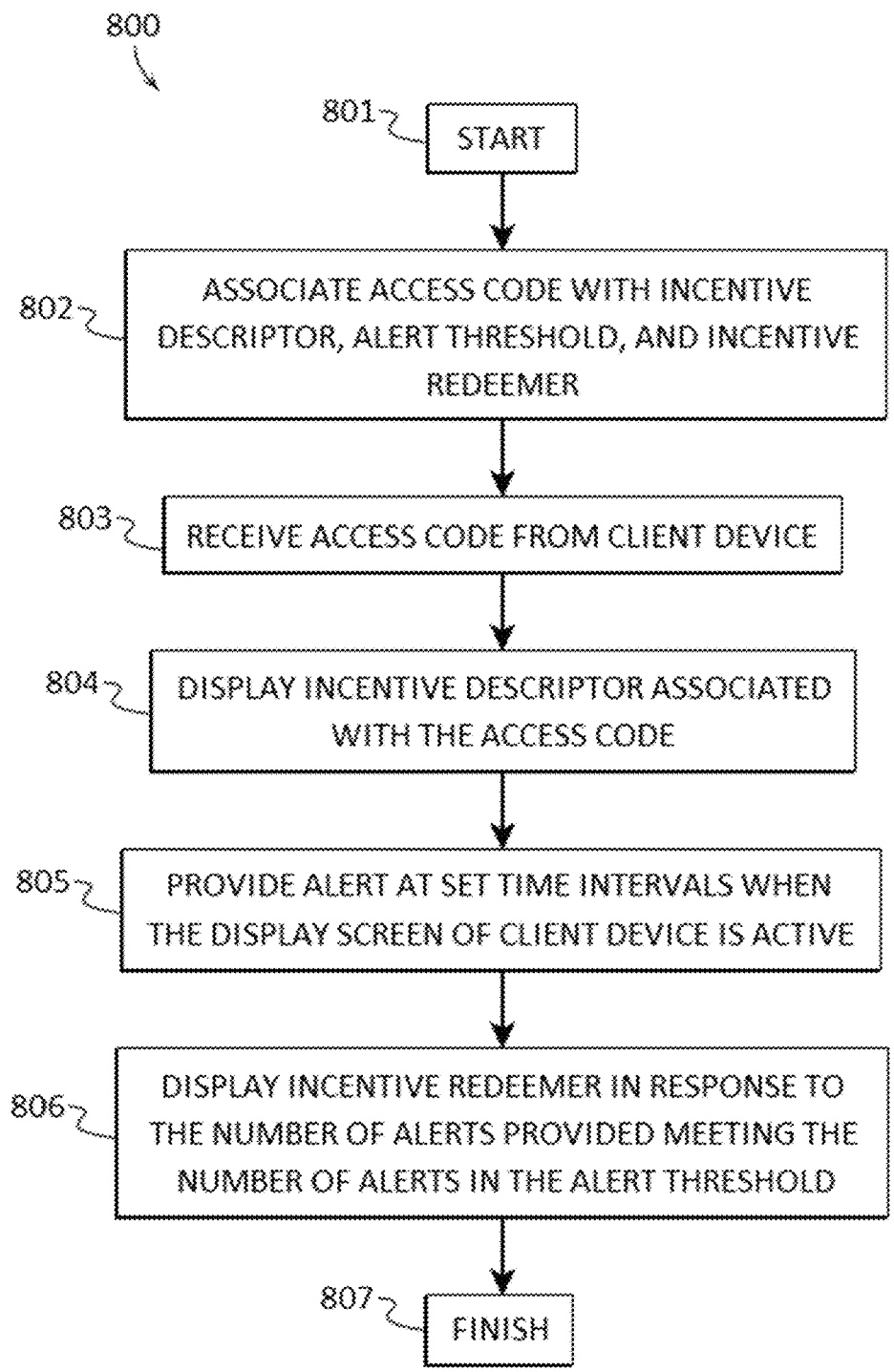
FIG. 8 illustrates a block diagram of an example of a computer-implemented method for modulating the display screen of a first electronic device according to various embodiments described herein.

FIG. 8 illustrates a block diagram of an example of a computer-implemented method for modulating the display screen of a first electronic device ("the method") 800 according to various embodiments described herein. The method 800 may be used to modulate the display screen 404A of one or more client devices 400 to provide incentives to a first user 101A and/or for reducing or preventing symptoms of computer vision syndrome.

In some embodiments, the method 800 may start 801 and a communications module 322 may associate an access code with an incentive descriptor, an alert threshold, and an incentive redeemer in the system database 200 by associating an access code data record 203 with an incentive descriptor data record 204, incentive redeemer data record 205, and alert threshold data record 206. Preferably, the alert threshold of the alert threshold data record 206 may comprise a number of alerts required to be provided to a client device 400 of a first user 101. In further embodiments, the access code may be associated with a second user 101B via a second user data record 202 in the system database 200 by a communications module 322 and the incentive descriptor data record 204 may include or be associated with contact information for the second user 101B contained in the second user data record 202.

Next in step 803, an access code may be received from a client device 400 of a first user 101A. In some embodiments, the first user 101A may input an access code via their client device 400 to a communications module 423 which may communicate with a communications module 322 of a server 300 to provide the access code to an incentivization module 321.

In step 804, one or more incentive descriptors associated with the access code may be displayed on the client device 400 of the first user 101A. In some embodiments, the incentivization module 321 may retrieve the one or more incentive descriptors of a incentive descriptor data record 204 that is associated with the access code data record 203 containing the access code that was received in step 803 and then provide the incentive descriptors to the display module 422 via the communications modules 322, 423. The display module 422 may then modulate or control the display screen 404A of the client device 400 of the first user 101A to display the one or more incentive descriptors. In further embodiments, the communications modules 322, 423, may periodically communicate with the system database 200 to periodically retrieve and update any incentive descriptors, alert thresholds, and incentive redeemers associated with an access code.

Next in step 805, one or more alerts may be provided at set time intervals when the display screen 404A of the client device 400 is active. In some embodiments, the timer module 421 may count down time intervals or time periods and the display module 422 may provide one or more alerts via the client device 400, such as through the display screen 404A, of the first user 101A when the display screen 404A of the client device 400 is active. The alerts provided by the display module 422 may be provided once a time period or interval has been counted down by the timer module 421. In some embodiments, alerts provided by the display module 422 may be provided once a time period or interval has been counted down by the timer module 421 in cycles of a first time period, a second time period, a third time period, and/or any other number of time periods. In further embodiments, alerts provided by the display module 422 may be provided once a time period or interval has been counted down by the timer module 421 in cycles of a first time period, a second time period, in which the first time period may be between 15 and 25 minutes the second time period may be between 15 and 25 seconds.

The display module 422 may be configured to provide audio alerts via a speaker I/O interface 404 and/or visual alerts via a display screen 404A to the first user 101A through their client device 400. In some embodiments, the display module 422 may modulate or control the display screen 404A so that one or more alerts may be displayed on a portion of the display screen 404A of the first client device 400 so that other information on the display screen 404A may be viewed with the alert. Preferably, the alerts provided by the display module 422 may include a message describing how to prevent computer vision syndrome symptoms. For example, after a twenty minute first time period or interval has been counted down by the timer module 421, the display module 422 may cause an alert to be displayed on the display screen 404A reminding the first user 101A to observe objects at least twenty feet away for twenty seconds or until another alert is provided after a second time period of twenty seconds is counted down.

In other embodiments, the display module 422 may modulate or control the display screen 404A so that one or more alerts disrupt the display of information displayed on the display screen 404A prior to the display of the alert. In some embodiments, input may be required to be provided to the client device 400 via a communications module 423 for the display module 422 to cease the display of an alert and resume the display of information that was displayed on the display screen 404A prior to the display of the alert.

In some embodiments, in which the access code received in step 803 is associated with a second user 101B via a second user data record 202 in the system database 200, information describing the number of alerts provided to the first user 101A via their respective first client device 400 may be provided to the second user 101B via their respective second client device 400.

Next in step 806, an incentive redeemer may be displayed in response to the number of alerts provided via the first client device 400 meeting the number of alerts in the alert threshold. In some embodiments, the incentive redeemer associated with the access code in the system database 200 may be displayed by the display module 422 on the display screen 404A of the first client device 400 in response to the number of alerts provided by the display module 422 via the first client device 400 meeting the number of alerts in the alert threshold also associated with the access code in the system database 200. In further embodiments in which the access code is associated with a second user 101B in the system database 200, information describing if the incentive redeemer was provided to the first client device 400 by the communications modules 322, 423, and/or displayed on the display screen 404A of the client device 400 by the display module 422 may be provided to the second user 101B via their respective second client device 400.

In further embodiments, the incentive redeemer may be provided on the display screen 404A of the first client device 400 by the display module 422 for a time period. In still further embodiments, once the incentive redeemer has been provided on the display screen 404A of the first client device 400, the display module 422 may prevent the incentive redeemer from being provided on the display screen 404A again. In even further embodiments, once the incentive redeemer has been provided on the display screen 404A of the first client device 400 for a time period, the display module 422 may prevent the incentive redeemer from being provided on the display screen 404A of the client device 400A after the time period has ended preferably counted down by the timer module 421. After step 806, the method 800 may finish 807.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device such as a personal digital assistant (PDA), laptop computer, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for modulating the display screen of a first client device of a patient, the method comprising the steps of:

the patient receiving an access code with the first client device;

associating the access code with a vision care provider in a system database;

displaying an incentive descriptor associated with the access code and associated with the vision care provider on the display screen of the first client device wherein the vision care provider created the incentive descriptor and wherein the incentive descriptor comprises at least one of (i) the name of the vision care provider and (ii) a vision care incentive;

providing alerts on the display screen of the first client device at set time intervals;

displaying an incentive redeemer unique to the vision care provider on the display screen of the first client device in response to the first client device reaching an alert threshold and wherein the incentive redeemer is configured to be redeemed with the vision care provider only upon the patient's first client device triggering the alert threshold;

transmitting information describing the first client device of the patient to a second client device accessible by the vision care provider; and wherein a first time period is provided between a first alert and a second alert and a second time period is provided between the second alert and a third alert, the first time period being less than the second time period.

2. The method of claim 1, wherein the alerts are displayed on a portion of the display screen of the first client device.

3. The method of claim 2, wherein the alerts disrupt the display of information displayed on the display screen.

4. The method of claim 3, wherein input is required to be provided to the first client device to cease the display of an alert and resume the display of information displayed on the display screen prior to the display of the alert.

5. The method of claim 1, wherein the alerts are provided in cycles of a first time period and a second time period, wherein the first time period is between 15 and 25 minutes, and wherein the second time period is between 15 and 25 seconds.

6. The method of claim 1, wherein the incentive descriptor includes contact information for the second user which is displayed on the first client device of the patient.

7. The method of claim 1, wherein the alerts provided via the first client device include a message describing how to prevent computer vision syndrome symptoms.

8. A method for modulating the display screen of a first client device of a patient, the method comprising the steps of:

the patient receiving an access code with the first client device;

associating the access code with a vision care provider in a system database;

displaying an incentive descriptor associated with the access code and associated with the vision care provider on the display screen of the first client device wherein the vision care provider created the incentive descriptor and wherein the incentive descriptor comprises at least one of (i) the name of the vision care provider and (ii) a vision care incentive;

providing alerts on the display screen of the first client device at set time intervals;

displaying an incentive redeemer unique to the vision care provider on the display screen of the first client device in response to the first client device reaching an alert threshold and wherein the incentive redeemer is configured to be redeemed with the vision care provider only upon the patient's first client device triggering the alert threshold;

transmitting information describing the first client device of the patient to a second client device accessible by the vision care provider; and wherein a second incentive descriptor is created by the vision care provider, transmitted to the system database, and displayed on the first client device of the patient and a second incentive redeemer is displayed on the first client device after a second alert threshold is reached by the first client device.

9. A method for modulating the display screen of a first client device of a patient, the method comprising the steps of:

the patient receiving an access code with the first client device;

associating the access code with a vision care provider in a system database;

displaying an incentive descriptor associated with the access code and associated with the vision care provider on the display screen of the first client device wherein the vision care provider created the incentive descriptor and wherein the incentive descriptor comprises at least one of (i) the name of the vision care provider and (ii) a vision care incentive;

providing alerts on the display screen of the first client device at set time intervals;

displaying an incentive redeemer unique to the vision care provider on the display screen of the first client device in response to the first client device reaching an alert threshold and wherein the incentive redeemer is configured to be redeemed with the vision care provider only upon the patient's first client device triggering the alert threshold;

transmitting information describing the first client device of the patient to a second client device accessible by the vision care provider; and wherein the incentive redeemer is provided on the display screen of the first client device for a time period, and wherein the incentive redeemer is locked from the first client device after the time period or upon being redeemed with the vision care provider.

* * * * *